United States Patent
Ikeda et al.

(10) Patent No.: US 10,926,637 B2
(45) Date of Patent: Feb. 23, 2021

(54) ONBOARD VOICE OUTPUTTING DEVICE, VOICE OUTPUTTING DEVICE, VOICE OUTPUTTING METHOD, AND COMPUTER-READABLE STORAGE MEDIUM

(71) Applicant: Toyota Jidosha Kabushiki Kaisha, Toyota (JP)

(72) Inventors: Jun Ikeda, Nagoya (JP); Masaki Tsukamoto, Toyota (JP); Hideo Hasegawa, Nagoya (JP); Yukiya Yamane, Tokyo-to (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/220,521

(22) Filed: Dec. 14, 2018

(65) Prior Publication Data
US 2019/0184826 A1 Jun. 20, 2019

(30) Foreign Application Priority Data
Dec. 20, 2017 (JP) .............................. JP2017-243724

(51) Int. Cl.
*B60K 35/00* (2006.01)
*G06K 9/00* (2006.01)
*G06F 3/16* (2006.01)
*B60R 11/02* (2006.01)
*B60K 37/06* (2006.01)

(52) U.S. Cl.
CPC .............. *B60K 35/00* (2013.01); *B60K 37/06* (2013.01); *B60R 11/0217* (2013.01); *G06F 3/167* (2013.01); *G06K 9/00838* (2013.01); *B60K 2370/148* (2019.05); *B60K 2370/15* (2019.05); *B60K 2370/1575* (2019.05); *B60K 2370/16* (2019.05); *B60K 2370/195* (2019.05); *B60K 2370/736* (2019.05); *B60K 2370/741* (2019.05)

(58) Field of Classification Search
CPC .......... B60K 2370/148; B60K 2370/15; B60K 2370/1575; B60K 2370/16; B60K 2370/195; B60K 2370/736; B60K 2370/741; B60K 35/00; B60K 37/06; B60R 11/0217; G06F 3/167; G06K 9/00838
See application file for complete search history.

(56) References Cited

U.S. PATENT DOCUMENTS

| | | | |
|---|---|---|---|
| 2008/0256755 A1* | 10/2008 | Ieda ........................ | E05B 49/00 16/412 |
| 2010/0028210 A1* | 2/2010 | Ozaki ................... | B60K 28/063 422/84 |
| 2013/0318625 A1* | 11/2013 | Fan ......................... | G06F 21/62 726/27 |
| 2016/0180853 A1 | 6/2016 | VanLund et al. | |
| 2017/0083285 A1 | 3/2017 | Meyers et al. | |
| 2019/0068407 A1* | 2/2019 | Haga ....................... | H04L 12/66 |

* cited by examiner

*Primary Examiner* — Nader Bolourchi
(74) *Attorney, Agent, or Firm* — Dinsmore & Shohl LLP (57) ABSTRACT

An onboard voice outputting device includes: a judging section that judges whether or not an occupant of a vehicle is alone; and an outputting section that, in a case in which it is judged by the judging section that the occupant of the vehicle is alone, outputs information, which is an object of outputting, to a voice outputting section that is installed in the vehicle and that outputs information by voice into a vehicle cabin.

12 Claims, 5 Drawing Sheets

ONBOARD VOICE OUTPUTTING DEVICE, VOICE OUTPUTTING DEVICE, VOICE OUTPUTTING METHOD, AND COMPUTER-READABLE STORAGE MEDIUM

CROSS-REFERENCE TO RELATED APPLICATION

This application is based on and claims priority under 35 USC 119 from Japanese Patent Application No. 2017-243724 filed on Dec. 20, 2017 the disclosure of which is incorporated by reference herein.

BACKGROUND

Technical Field

The present disclosure relates to an onboard voice outputting device, a voice outputting device, a voice outputting method, and a computer-readable storage medium storing a voice outputting program.

Related Art

United States Patent Application Publication No. 2016/180853 (Patent Document 1) discloses a voice system having a voice outputting device that is set within a facility that a user secures. In this voice system, the voice outputting device plays-back plural audio contents such as music and audio books and the like.

Further, United States Patent Application Publication No. 2017/083285 (Patent Document 2) discloses a technique of selecting, from plural devices, a device that outputs a response to an utterance of a user.

By the way, there are cases in which information is to be conveyed to only a specific user, and it is not desired to convey the information to users other than the specific user, such as, for example, in a case in which information that is addressed to the specific user and has been received by a messaging service is to be outputted by voice from a voice outputting device, or the like. In such a case, if the information is outputted by voice from the voice outputting device without confirming whether or not other users are present around the specific user, problems may arise from the standpoint of privacy protection. However, such problems are not considered in the techniques of Patent Document 1 and Patent Document 2.

SUMMARY

The present disclosure was made in consideration of the above-described circumstances, and an object thereof is to convey information to a user while protecting the privacy of the user.

A first aspect includes; a judging section that judges whether or not an occupant of a vehicle is alone; and an outputting section that, in a case in which it is judged by the judging section that the occupant of the vehicle is alone, outputs information, which is an object of outputting, to a voice outputting section that is installed in the vehicle and that outputs information by voice into a vehicle cabin.

In accordance with the first aspect, in a case in which it is judged that the occupant of the vehicle is alone, information is outputted from the voice outputting section. Accordingly, information can be conveyed to a user while the privacy of the user is protected.

Note that the second aspect is the first aspect that further includes an identifying section that identifies occupants of the vehicle, wherein the judging section further judges whether or not a destination of conveying the information is a vehicle occupant who has been identified by the identifying section, and, in a case in which the judging section judges that the occupant of the vehicle is alone and that the destination of conveying the information that is the object of outputting is the vehicle occupant who has been identified by the identifying section, the outputting section outputs, to the voice outputting section, the information that is the object of outputting.

In accordance with the second aspect, information is outputted from the voice outputting section in a case in which it is judged that the occupant of the vehicle is alone and the destination of conveying of the information is an identified vehicle occupant. Accordingly, information can be conveyed to a user while the privacy of the user is protected at a high level.

In a third aspect, in the second aspect, the identifying section identifies an occupant of the vehicle by using at least one of a voice which has been uttered by the occupant of the vehicle and has been inputted via a voice inputting section installed in the vehicle, an image of the occupant of the vehicle that has been obtained by image capturing by an imaging device installed in the vehicle, and identification information of a portable terminal that is possessed by the occupant of the vehicle.

In accordance with the third aspect, an occupant of the vehicle is identified by using at least one of a voice which has been uttered by the occupant of the vehicle and has been inputted via the voice inputting section that is installed in the vehicle, an image of the occupant of the vehicle which has been obtained by image capturing by an imaging device installed in the vehicle, and identification information of a portable terminal possessed by the occupant of the vehicle. Accordingly, the occupant of the vehicle can be identified easily.

In a fourth aspect, in the second or third aspect, in a case in which the information that is the object of outputting is to be outputted by voice from the voice outputting section, the judging section further judges whether or not a voice to be outputted will be conveyed to an exterior of the vehicle, and the outputting section outputs, to the voice outputting section, the information that is the object of outputting, in a case in which the judging section judges that the occupant of the vehicle is alone and that the destination of conveying the information that is the object of outputting is the vehicle occupant who has been identified by the identifying section and that the voice that is to be outputted will not be conveyed to the exterior of the vehicle.

In accordance with the fourth aspect, information is outputted from the voice outputting section in a case in which it is judged that the occupant of the vehicle is alone and that the destination of conveying the information is an identified vehicle occupant and that the voice that is to be outputted from the voice outputting section will not be conveyed to an exterior of the vehicle. Accordingly, information can be conveyed to a user while the privacy of the user is protected at an even higher level.

In a fifth aspect, in the fourth aspect, the judging section judges that the voice to be outputted will be conveyed to the exterior of the vehicle when at least one case exists among a case in which a window of the vehicle is open, a case in which a door of the vehicle is open, a case in which a roof of the vehicle is open, and a case in which a portable terminal that the occupant of the vehicle possesses is currently being used in a telephone call.

In accordance with the fifth aspect, it is judged that the voice to be outputted will be conveyed to the exterior of the vehicle when at least one case exists among a case in which a window of the vehicle is open, a case in which a door of the vehicle is open, a case in which the roof of the vehicle is open, and a case in which a portable terminal that the occupant of the vehicle possesses is currently being used in a telephone call. Accordingly, it can easily be judged whether or not the voice which is to be outputted from the voice outputting section, will be conveyed to the exterior of the vehicle.

A sixth aspect includes: a judging section that judges whether or not a person, who exists within a predetermined region, is alone; and an outputting section that, in a case in which it is judged by the judging section that the person is alone, outputs information, which is an object of outputting, to a voice outputting section that is provided within the region and that outputs information by voice into the region.

In accordance with the sixth aspect, in the same way as in the first aspect, information can be conveyed to a user while the privacy of the user is protected.

Further, in a seventh aspect, a computer executes processing of: judging whether or not an occupant of, a vehicle is alone; and, in a case in which it is judged that the occupant of the vehicle is alone, outputting information, which is an object of outputting, to a voice outputting section that is installed in the vehicle and that outputs information by voice into a vehicle cabin.

In accordance with the seventh aspect, in the same way as in the first aspect, information can be conveyed to a user while the privacy of the user is protected.

Further, in an eighth aspect, a computer is made to execute processing comprising: judging whether or not an occupant of a vehicle is alone; and, in a case in which it is judged that the occupant of the vehicle alone, outputting information, which is an object of outputting, to a voice outputting section that is installed in the vehicle and that outputs information by voice into a vehicle cabin.

In accordance with the eighth aspect, in the same way as in the first aspect, information can be conveyed to a user while the privacy of the user is protected.

As described above, in accordance with the present disclosure, the effect is obtained that information can be conveyed to a user while the privacy of the user is protected.

DETAILED DESCRIPTION

An embodiment for implementing the present disclosure is described in detail hereinafter with reference to the drawings.

Figure 1:
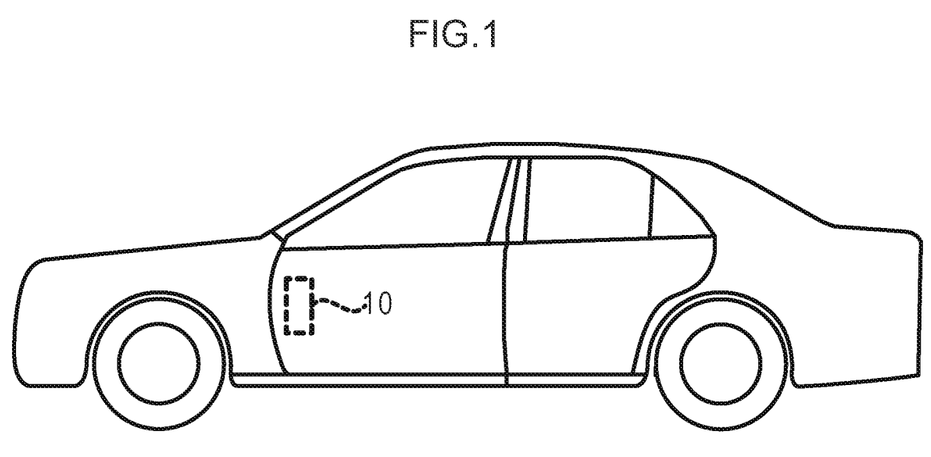
FIG. 1 is a side view showing an example of an installed position of a voice outputting device in a vehicle relating to an embodiment.

First, the structures within a vehicle relating to the present embodiment are described with reference to FIG. 1. As shown in FIG. 1, a voice outputting device 10 is installed within the vehicle relating to the present embodiment. The voice outputting device 10 is provided, for example, at the lower portion of the center console. Note that the position at which the voice outputting device 10 is installed within the vehicle is not limited to the lower portion of the center console, and it suffices for the voice outputting device 10 to be at a position at which occupants of the vehicle can hear the voice outputted from the voice outputting device 10.

Figure 2:
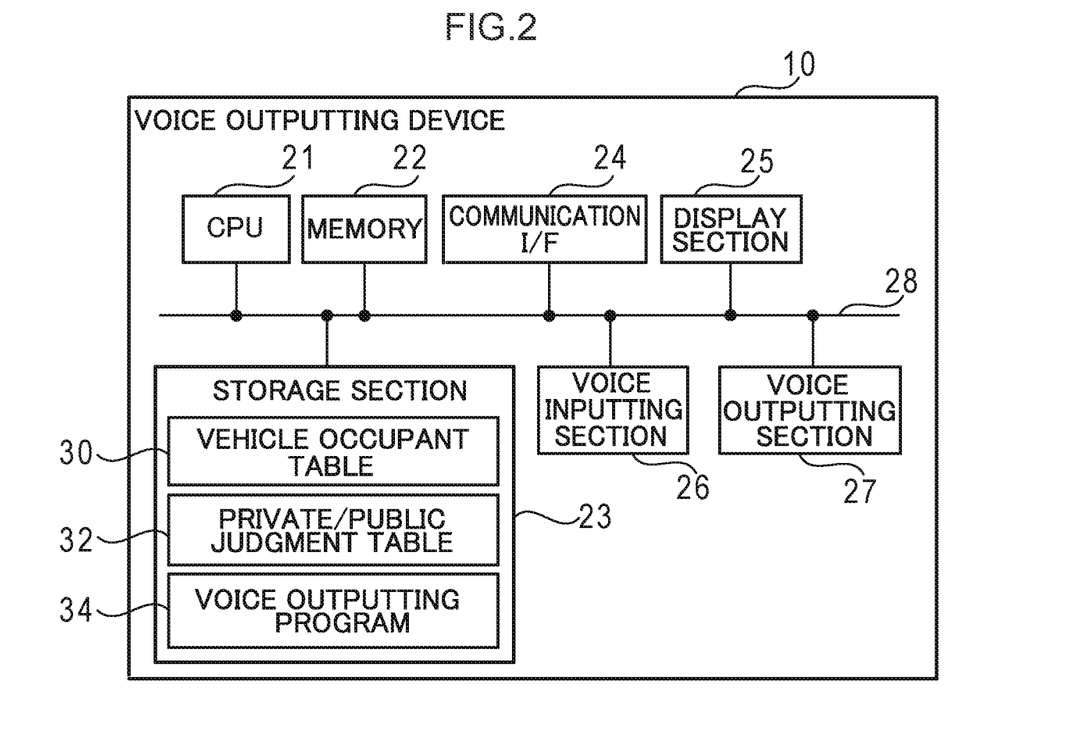
FIG. 2 is a block drawing showing an example of hardware structures of the voice outputting device relating to the embodiment.

The hardware structures of the voice outputting device 10 are described next with reference to FIG. 2. As shown in FIG. 2, the voice outputting device 10 includes a CPU (Central Processing Unit) 21, a memory 22 that serves as a temporary storage region, and a non-volatile storage section 23. Further, the voice outputting device 10 includes a communication I/F (InterFace) 24 that is used at the time of carrying out communication with external devices, a display section 25 such as a liquid crystal display or the like, a voice inputting section 26 such as a microphone or the like, and a voice outputting section 27 such as a speaker or the like that outputs information into the vehicle cabin by a voice. The CPU 21, the memory 22, the storage section 23, the communication I/F 24, the display section 25, the voice inputting section 26 and the voice outputting section 27 are connected to a bus 28. Note that an AI (Artificial Intelligence) speaker is an example of the voice outputting device 10.

Figure 3:
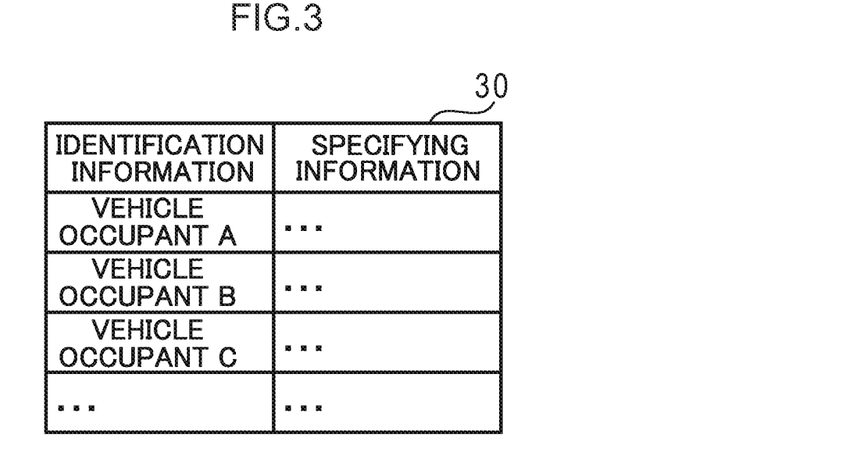
FIG. 3 is a drawing showing an example of a vehicle occupant table relating to the embodiment.

A vehicle occupant table 30, private/public judgment tables 32, and a voice outputting program 34 arc stored in the storage section 23. An example of the vehicle occupant table 30 is shown in FIG. 3. The vehicle occupant table 30 is a table that is used in identifying the occupants of the vehicle. As shown in FIG. 3, identification information that is for identifying vehicle occupants who may be riding in the vehicle, and specifying information that is used in specifying the vehicle occupants of the vehicle, are stored in association in the vehicle occupant table 30 relating to the present embodiment. In the present embodiment, a characteristic amount, which is obtained by carrying out face detecting processing on images that are obtained by imaging devices such as digital cameras or the like capturing the faces of vehicle occupants identified by the identification information, are stored as the specifying information. The vehicle occupant table 30 is stored in advance in the storage section 23.

Figure 4:
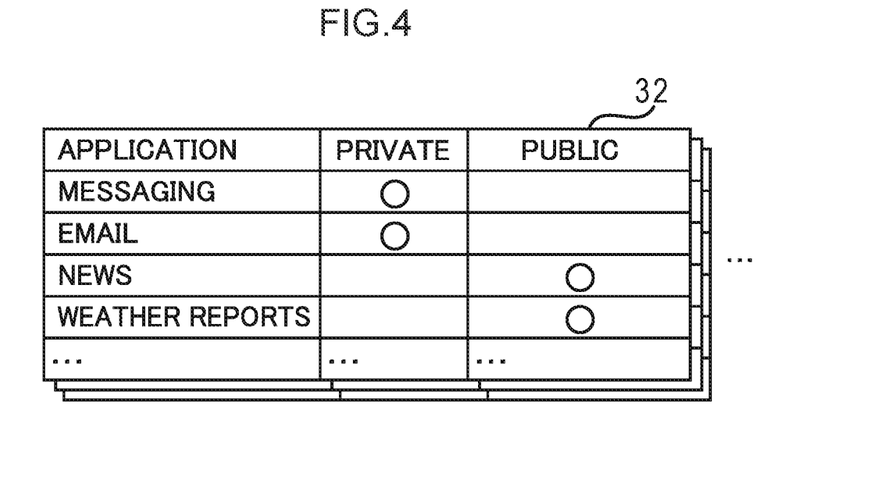
FIG. 4 is a drawing showing an example of a private/public judgment table relating to the embodiment.

FIG. 4 shows an example of the private/public judgment table 32. The private/public judgment table 32 is a table that is used in judging whether information that is the object of outputting by the voice outputting device 10 is information that is to be conveyed to only one person, or is information that may be conveyed to plural persons. As shown in FIG. 4, the private/public judgment table 32 relating to the present embodiment stores, for each application that is a source of generating information that is the object of outputting by the voice outputting device 10, information that expresses whether the information generated by that application is for one person (private) or is for other than one person (public). The example of FIG. 4 shows that information, which is generated by an application that reads aloud information received by a messaging service, is information for one person, i.e., is information that is to be conveyed to only one person. Further, the example of FIG. 4 shows that information, which is generated by an application that reads aloud news, is information that is for other than one person, i.e., is information that may be conveyed to plural persons. The private/public judgment table 32 is prepared in advance for each vehicle occupant identified by the identification information stored in the vehicle occupant table 30, and is stored in the storage section 23.

Figure 5:
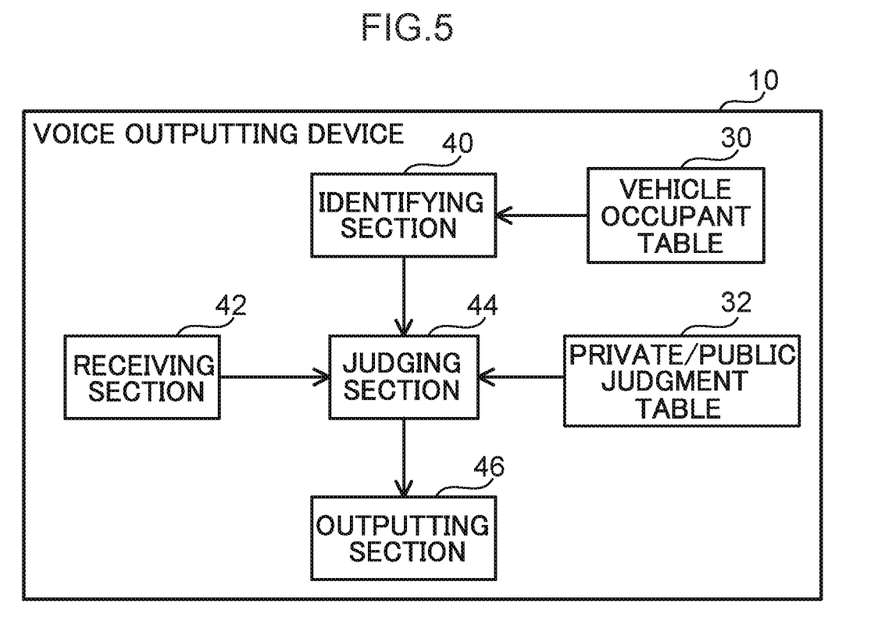
FIG. 5 is a block drawing showing an example of functional structures of the voice outputting device relating to the embodiment.

The functional structures of the voice outputting device 10 relating to the present embodiment are described next with reference to FIG. 5. As shown in FIG. 5, the voice outputting device 10 includes an identifying section 40, a receiving section 42, a judging section 44, and an outputting section 46. By executing the voice outputting program 34 that is stored in the storage section 23, the CPU 21 functions as the identifying section 40, the receiving section 42, the judging section 44 and the outputting section 46 that are shown in FIG. 5.

The identifying section 40 identifies the occupants of the vehicle. The identifying section 40 relating to the present embodiment acquires characteristic amounts of the faces of the occupants of the vehicle by carrying out processing, which detects faces of persons, on images of the vehicle occupants that are obtained by image capturing by onboard cameras (not illustrated) provided within the vehicle. Then, the identifying section 40 refers to the vehicle occupant table 30, and identifies occupants of the vehicle by acquiring the identification information of records in which characteristic amounts, whose degrees of similarity with the acquired characteristic amounts of the faces are the highest and that are greater than or equal to a threshold value, are stored in the specifying information column.

Note that the identifying section 40 may identify occupants of the vehicle by acquiring, via the voice inputting section 26, voices of vehicle occupants who have made utterances within the vehicle, and using the voiceprints of the acquired voices. In this case, an example is a form in which voiceprint information, which expresses voiceprints of voices uttered by vehicle occupants identified by the identification information, are stored as the specifying information of the vehicle occupant table 30.

Further, for example, the identifying section 40 may acquire identification information of portable terminals by carrying out wireless communication via the communication I/F 24 with the portable terminals such as smart phones or the like that the occupants of the vehicle possess, and may identify the occupants of the vehicle by using the acquired identification information of the portable terminals. In this case, an example is a form in which identification information of the portable terminals, which are possessed by the vehicle occupants identified by the identification information, are stored as the specifying information of the vehicle occupant table 30.

Further, for example, the identifying section 40 may identify the occupants of the vehicle by using two or more types among the above-described images of the vehicle occupants obtained by image capturing by onboard cameras, voices which the occupants of the vehicle have uttered, and identification information of portable terminals that the occupants of the vehicle possess.

The receiving section 42 receives information that is the object of outputting that was generated by an application running on the voice outputting device 10. An application that reads aloud messages received by a messaging service, an application that reads aloud news or weather reports or the like, and the like are examples of applications that run on the voice outputting device 10.

The judging section 44 judges whether or not the information received by the receiving section 42 is information that is to be conveyed to only one person. Concretely, the judging section 44 refers to the private/public judgment table 32 that corresponds to the vehicle occupant identified by the identifying section 40, and judges whether or not the application that was the source of generation of the information received, by the receiving section 42 is private. By this judgment, the judging section 44 judges whether or not the information received by the receiving, section 42 is information that is to be conveyed to only one person.

Further, by judging whether or not the number of vehicle occupants identified by the identifying section 40 is one, the judging section 44 judges whether or not the vehicle occupant is alone in the vehicle. Note that the judging section may judge whether or not the vehicle occupant is alone by further using at least one of seating sensors that sense that vehicle occupants are seated in the respective seats provided within the vehicle, operation history of various types of switches that are provided within the vehicle, opening/closing history of the doors of the vehicle, and infrared sensors. For example, in a case in which all of the outputs that are used in this judgment indicate that the vehicle occupant is alone, the judging section 44 judges that the vehicle occupant is alone. In this case, the accuracy of the judgment, by the judging section 44, as to whether or not the occupant of the vehicle is alone can be improved.

Further, the judging section 44 judges whether or not the destination of conveying the information received by the receiving section 42 is a vehicle occupant who has been identified by the identifying section 40.

Moreover, in a case in which information is to be outputted by voice from the voice outputting section 27, the judging section 44 judges whether or not the outputted voice will be conveyed to the exterior of the vehicle. Concretely, the judging section 44 judges that the voice that is to be outputted by the voice outputting section 27 will be conveyed to the exterior of the vehicle when at least one of the following cases exists: a case in which a window of the vehicle is open, a case in which a door of the vehicle is open, a case in which the roof of the vehicle is open, and a case in which a portable terminal that an occupant of the vehicle possesses is currently being used in a telephone call. Further, if none of these cases currently exists, the judging section 44 judges that the voice to be outputted from the voice outputting section 27 will not be conveyed to the vehicle exterior.

Note that, for example, the judging section 44 judges whether or not a window of the vehicle is open by using the outputs of sensors that sense the opening/closing of the windows of the vehicle. Further, for example, the, judging section 44 judges whether or not a door of the vehicle is open by using the outputs of sensors that sense the opening/closing of the doors of the vehicle. Further, for example, the judging section 44 judges whether or not the roof of the vehicle is open by using the output of a sensor that senses the opening/closing of the roof of the vehicle. Further, for example, the judging section judges whether or not, a portable terminal is currently being used in a telephone call by acquiring state information, which expresses the state of the portable terminal, by carrying out communication via the communication I/F 24 with the portable terminals that the occupants of the vehicle possess, and by using the acquired state information.

The information received by the receiving section 42 is outputted to the voice outputting section 27 in a case in which it is judged by the judging section 44 that the vehicle occupant is alone and it is judged that the destination of the conveying of the information received by the receiving section 42 is a vehicle occupant identified by the identifying section 40, and the following condition is met. Namely, in this case, the outputting section 46 outputs the information received by the receiving section 42 to the voice outputting section 27 in a case in which it is further judged by the judging section 44 that the voice to be outputted from the voice outputting section 27 will not be conveyed to the exterior of the vehicle.

Figure 6:
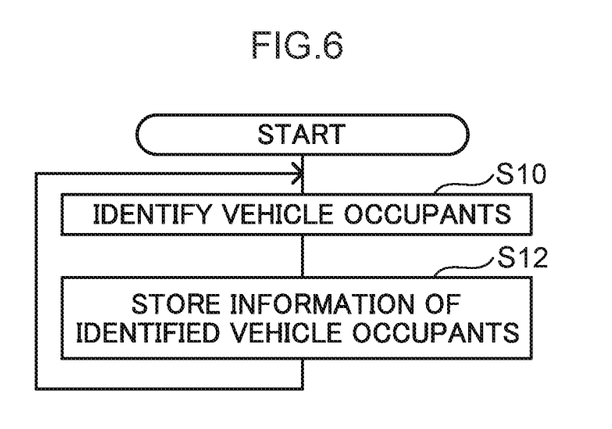
FIG. 6 is a flowchart showing an example of vehicle occupant identifying processing relating to the embodiment.

Operation of the voice outputting device 10 relating to the present embodiment is described next with reference to FIG. 6 and FIG. 7. Note that FIG. 6 is a flowchart showing an example of the flow of vehicle occupant identifying processing that is executed by the CPU 21 of the voice outputting device 10 relating to the present embodiment. Further, in the present embodiment, the vehicle occupant identifying processing shown in FIG. 6 is executed due to the CPU 21 executing the voice outputting program 34 that is stored in advance in the storage section 23. Further, the vehicle occupant identifying processing shown in FIG. 6 is executed, for example, when the ignition switch of the vehicle is turned on.

Figure 7:
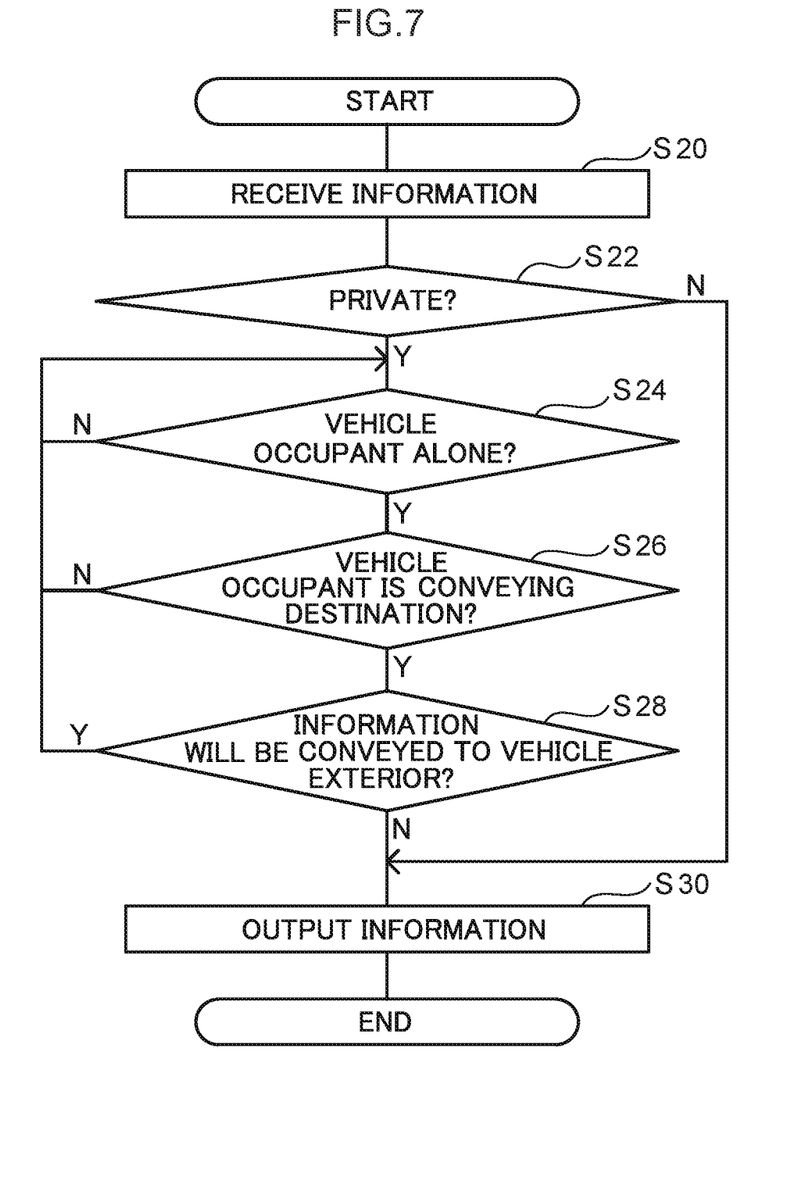
FIG. 7 is a flowchart showing an example of voice outputting processing relating to the embodiment.

FIG. 7 is a flowchart showing an example of the flow of voice outputting processing that is executed by the CPU 21 of the voice outputting device 10 relating to the present embodiment. Further, in the present embodiment, the voice outputting processing shown in FIG. 7 is executed due to the CPU 21 executing the voice outputting program 34 that is stored in advance in the storage section 23. Further, the voice outputting processing shown in FIG. 7 is executed, for example, when information that is the object of outputting is generated by an application running on the voice outputting device 10.

In step S10 of FIG. 6, as described above, the identifying section 40 refers to the vehicle occupant table 30 and identifies the occupants of the vehicle. In step S12, the identifying section 40 stores (updates), in the storage section 23, the identification information of the vehicle occupants identified by the processing of step S10. When the processing of step S12 ends, the routine returns to step S10. Namely, the most recent identification information of the occupants of the vehicle are stored in the storage section 23 due to the processing of step S10 and step S12 being executed periodically.

In step S20 of FIG. 7, the receiving section 42 receives information that is the object of outputting which has been generated by an application running on the voice outputting device 10, In step S22, as described above, the judging section 44 refers to the private/public judgment table 32, which corresponds to the vehicle occupant identified by the identifying section 40 i.e., the vehicle occupant indicated by the identification information that is stored in the storage section 23, and judges whether or not the application that is the source of generation of the information received in step S20 is private. If this judgment is affirmative, the routine moves on to step S24. If this judgment is negative, the routine moves on to step S30 without executing the processing from step S24 through step S28.

In step S24, the judging section 44 judges whether or not the occupant of the vehicle is alone by judging whether or not the number of vehicle occupants identified by the identifying section 40, i.e., the number of items of identification information of vehicle occupants stored in the storage section 23, is one. If this judgment is affirmative, the routine moves on to step S26, and, if this judgment is negative, the processing of step S24 is executed again.

In step S26, the judging section 44 judges whether or not the destination of conveying of the information received by the processing of step S20 is a vehicle occupant who was identified by the identifying section 40, i.e., a vehicle occupant indicated by the identification information that is stored in the storage section 23. If this judgment is negative, the routine returns to step S24, and, if this judgment is affirmative, the routine moves on to step S28.

In step S28, as described above, if the information is to be outputted by voice from the voice outputting section 27, the judging section 44 judges whether or not the outputted voice will be conveyed to the exterior of the vehicle. If this judgment is affirmative, the routine returns to step S24. If this judgment is negative, the routine moves on to step S30.

In step S30, the outputting section 46 outputs, to the voice outputting section 27, the information that was received by the processing of step S20. Due to the processing of step S30, the information that was received by the processing of step S20 is outputted by voice from the voice outputting section 27. When the processing of step S30 ends, the voice outputting processing end.

As described above, in accordance with the present embodiment, information is outputted by voice from the voice outputting section 27 in a case in which it is judged that the occupant of the vehicle is alone. Accordingly, information can be conveyed to the user while the privacy of the user is protected.

Note that the above-described embodiment describes an example in which information is outputted by voice from the voice outputting section in a case in which it is judged that the occupant of the vehicle is alone. However, the present invention is not limited to this. For example, there may be a form in which information is outputted by voice from the voice outputting section in a case in which it is judged that a person, who exists within a predetermined region such as within a house or the like, is alone.

Further, the above-described embodiment describes an example in which information is outputted by voice from the voice outputting section in a case in which it is judged that the occupant of the vehicle is alone and that the destination of conveying the information is the identified vehicle occupant. However, the present invention is not limited to this. For example, there may be a form in which, in a case in which the voice outputting device 10 is for individual use, or the like, the information is outputted by voice from the voice outputting section when it is judged that the vehicle occupant is alone, without carrying out the, judgment as to whether or not the destination of conveying the information is the identified vehicle occupant.

Further, there may be a form in which a computer, which is connected to the voice outputting, device 10 via a network, executes the voice outputting processing that is carried out by the CPU 21 of the voice outputting device 10 in the above-described embodiment. In this case, for example, the voice outputting device 10 transmits, to the computer via the network, the identification information of the vehicle occupants identified by the execution of the vehicle occupant identifying processing. Further, in this case, the voice outputting device 10 transmits, to the computer via the network, the respective output information that are the outputs of the sensors that sense the opening/closing of the windows of the vehicle, the outputs of the sensors that sense the opening/closing of the doors of the vehicle, and the output of the sensor that senses the opening/closing of the roof of the vehicle. Further, in this case, the computer executes the processing of step S20 through step S30 of the above-described voice outputting processing by using the identification information of the vehicle occupants and the respective output information that were transmitted front the voice outputting device 10. In this case, in step S30, the computer outputs (transmits) the information, which is the object of outputting, to the voice outputting device 10 via the network. Then, the voice outputting device 10 outputs, by voice from the voice outputting section 27, the information that is the object of outputting that was transmitted from the computer.

Further, description has been given of a case in which the vehicle occupant identifying processing and the voice outputting processing that are carried out by the CPU 21 in the above-described embodiment are software processing that are carried out by the execution of programs, but these may be processing that are carried out by hardware. Further, the vehicle occupant identifying processing and the voice outputting processing may be carried out by combining both hardware and software. Moreover, the voice outputting program 34 that is stored in the storage section 23 may be stored on any of various types of storage media and distributed.

The present disclosure is not limited to the above-described embodiment. Other embodiments can of course be implemented by being modified in various ways within a scope that does not depart from the gist thereof.

What is claimed is:

1. An onboard voice outputting device comprising:
 a processor that is configured to execute a processing, the processing including:
 judging whether information received by a receiving section of the onboard voice outputting device is information that is to be conveyed to only one person by judging whether an application that is a source of generation of the information is private; and
 in a case in which it is judged that the information received by the receiving section is the information that is to be conveyed to only one person:
 judging whether or not an occupant of a vehicle is alone; and
 in a case in which it is judged that the occupant of the vehicle is alone, outputting the information to a voice outputting section that is installed in the vehicle and that outputs the information by voice into a vehicle cabin.

2. The onboard voice outputting device of claim 1, wherein the processing further comprises:
 identifying occupants of the vehicle;
 judging whether or not a destination of conveying the information is a vehicle occupant who has been identified; and
 in a case in which the processor judges that the occupant of the vehicle is alone and that the destination of conveying the information is the vehicle occupant who has been identified, outputting, to the voice outputting section, the information.

3. The onboard voice outputting device of claim 2, wherein the processor identifies an occupant of the vehicle by using at least one of a voice which has been uttered by the occupant of the vehicle and has been inputted via a voice inputting section installed in the vehicle, an image of the occupant of the vehicle that has been obtained by image capturing by an imaging device installed in the vehicle, and identification information of a portable terminal that is possessed by the occupant of the vehicle.

4. The onboard voice outputting device of claim 2, wherein
 in a case in which the information is to be outputted by voice from the voice outputting section, the processor judges whether or not a voice to be outputted will be conveyed to an exterior of the vehicle, and
 the processor outputs, to the voice outputting section, the information, in a case in which the processor judges that the occupant of the vehicle is alone and that the destination of conveying the information is the vehicle occupant who has been identified and that the voice that is to be outputted will not be conveyed to the exterior of the vehicle.

5. The onboard voice outputting device of claim 3, wherein
 in a case in which the information is to be outputted by voice from the voice outputting section, the processor further judges whether or not a voice to be outputted will be conveyed to an exterior of the vehicle, and
 the processor outputs, to the voice outputting section, the information, in a case in which the processor judges that the occupant of the vehicle is alone and that the destination of conveying the information is the vehicle occupant who has been identified and that the voice that is to be outputted will not be conveyed to the exterior of the vehicle.

6. The onboard voice outputting device of claim 4, wherein the processor judges that the voice to be outputted will be conveyed to the exterior of the vehicle when at least one case exists among a case in which a window of the vehicle is open, a case in which a door of the vehicle is open, a case in which a roof of the vehicle is open, and a case in which a portable terminal that the occupant of the vehicle possesses is currently being used in a telephone call.

7. The onboard voice outputting device of claim 5, wherein the processor judges that the voice to be outputted will be conveyed to the exterior of the vehicle when at least one case exists among a case in which a window of the vehicle is open, a case in which a door of the vehicle is open, a case in which a roof of the vehicle is open, and a case in which a portable terminal that the occupant of the vehicle possesses is currently being used in a telephone call.

8. A voice outputting method wherein a computer executes processing of:
 judging whether information received by a receiving section of an onboard voice outputting device is information that is to be conveyed to only one person by judging whether an application that is a source of generation of the information is private; and
 in a case in which it is judged that the information received by the receiving section is the information that is to be conveyed to only one person:
 judging whether or not an occupant of a vehicle is alone; and
 in a case in which it is judged that the occupant of the vehicle is alone, outputting the information to a voice outputting section that is installed in the vehicle and that outputs the information by voice into a vehicle cabin.

9. A non-transitory computer-readable storage medium storing a voice outputting program for causing a computer to execute processing comprising:
 judging whether information received by a receiving section of an onboard voice outputting device is information that is to be conveyed to only one person by judging whether an application that is a source of generation of the information is private; and in a case in which it is judged that the information received by the receiving section is the information that is to be conveyed to only one person:
  judging whether or not an occupant of a vehicle is alone; and in a case in which it is judged that the occupant of the vehicle is alone, outputting the information to a voice outputting section that is installed in the vehicle and that outputs the information by voice into a vehicle cabin.

10. An onboard voice outputting device comprising:
a processor that is configured to execute a processing, the processing including:
judging whether or not an occupant of a vehicle is alone;
in a case in which a message is to be outputted by voice from a voice outputting section:
  judging whether a destination of the message is the occupant of the vehicle; and
  judging whether or not the voice to be outputted will be conveyed to an exterior of the vehicle; and
in response to judging that the occupant of the vehicle is alone, an application that is a source of generation of the message is private, the destination of the message is the occupant of the vehicle, and that the voice to be outputted will not be conveyed to the exterior of the vehicle, outputting the message to the voice outputting section that is installed in the vehicle and that outputs the message by voice into a vehicle cabin.

11. The onboard voice outputting device of claim 10, wherein the processing further comprises:
  identifying occupants of the vehicle; and
  in a case in which the processor judges that the occupant of the vehicle is alone and that the destination of conveying the message is the vehicle occupant who has been identified, outputting, to the voice outputting section, the message.

12. The onboard voice outputting device of claim 11, wherein the processor identifies an occupant of the vehicle by using at least one of a voice which has been uttered by the occupant of the vehicle and has been inputted via a voice inputting section installed in the vehicle, an image of the occupant of the vehicle that has been obtained by image capturing by an imaging device installed in the vehicle, and identification information of a portable terminal that is possessed by the occupant of the vehicle.

* * * * *

UNITED STATES PATENT AND TRADEMARK OFFICE
CERTIFICATE OF CORRECTION

PATENT NO. : 10,926,637 B2  
APPLICATION NO. : 16/220521  
DATED : February 23, 2021  
INVENTOR(S) : Jun Ikeda et al.

Page 1 of 1

It is certified that error appears in the above-identified patent and that said Letters Patent is hereby corrected as shown below:

In the Specification

In Column 3, Line(s) 11, after "voice", insert --,--.

In Column 3, Line(s) 26, after "of", delete ",".

In Column 6, Line(s) 11, after "received", delete ",".

In Column 6, Line(s) 13, after "receiving", delete ",".

In Column 6, Line(s) 54, after "the", delete ",".

In Column 6, Line(s) 61, after "not", delete ",".

In Column 7, Line(s) 52, after "10", delete "," and insert --.--, therefor.

In Column 8, Line(s) 50, after "the", delete ",".

In Column 8, Line(s) 54, after "outputting", delete ",".

In Column 9, Line(s) 5, delete "front" and insert --from--, therefor.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*